(12) United States Patent
Nishikawa et al.

(10) Patent No.: US 7,586,695 B2
(45) Date of Patent: Sep. 8, 2009

(54) METHOD OF MANUFACTURING COMPOSITE OPTICAL COMPONENT AND THE COMPOSITE OPTICAL COMPONENT

(75) Inventors: Yukio Nishikawa, Osaka (JP); Masayuki Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 11/889,299

(22) Filed: Aug. 10, 2007

(65) Prior Publication Data

US 2008/0100921 A1    May 1, 2008

(30) Foreign Application Priority Data

Oct. 27, 2006   (JP)   ............... 2006-291871

(51) Int. Cl.
*G02B 27/00*   (2006.01)
*G02B 3/00*    (2006.01)
*B29D 11/00*   (2006.01)

(52) U.S. Cl. ........................... 359/809; 264/2.7

(58) Field of Classification Search ................ 359/642, 359/718, 741, 809, 619, 620; 65/37, 39, 65/385; 264/1.1, 1.37, 1.7, 2.7
See application file for complete search history.

(56) References Cited

U.S. PATENT DOCUMENTS 4,268,134 A * 5/1981 Gulati et al. ............... 351/163
6,829,109 B2 * 12/2004 Kikuchi .......................... 65/37

FOREIGN PATENT DOCUMENTS

JP   408190004   * 7/1996

* cited by examiner

*Primary Examiner*—Alicia M Harrington
(74) *Attorney, Agent, or Firm*—Steptoe & Johnson LLP

(57) ABSTRACT

When a core lens is introduced into a cavity, resin is injected into the cavity, and a resin layer is formed around the core lens, the core lens is centered by sandwiching the core lens between first and second bell clamp type holders and applying a load to the core lens, and the resin layer is molded by injecting the resin from the outer periphery of the core lens to the lens center of the core lens in the first and second bell clamp type holders.

7 Claims, 9 Drawing Sheets

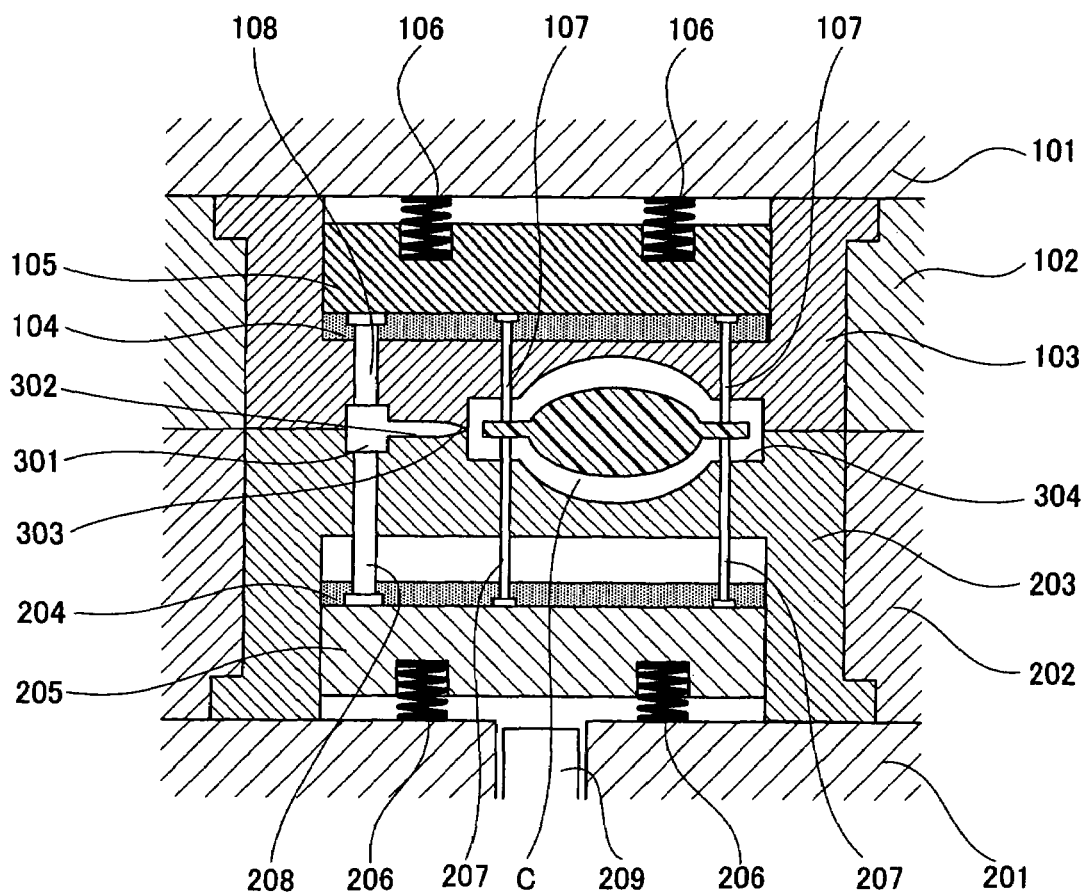

METHOD OF MANUFACTURING COMPOSITE OPTICAL COMPONENT AND THE COMPOSITE OPTICAL COMPONENT

FIELD OF THE INVENTION

The present invention relates to a method of manufacturing a composite optical component and the composite optical component by which a chromatic aberration, a spherical aberration, and so on are corrected with a combination of at least two lens elements.

BACKGROUND OF THE INVENTION

A conventional method of manufacturing a composite optical component is disclosed in Japanese Patent Laid-Open No. 63-225557, Japanese Patent Laid-Open No. 60-243601, and so on. In this method, the joining faces of lenses are bonded to each other with an adhesive, or casting is performed on a glass lens introduced into a die to form a lens on one of the front side and the back side of the glass lens, so that a composite optical component is manufactured.

In this manufacturing method, adhesion decreases over time and exfoliation occurs. Further, defoaming is necessary on the joints. Since problems in reliability and manufacturability occur, manufacturing methods achieving high manufacturability and low cost are disclosed in Japanese Patent Laid-Open No. 8-187793, Japanese Patent Laid-Open No. 8-190004, Japanese Patent Laid-Open No. 11-23809, Japanese Patent Laid-Open No. 2006-126336, and so on.

For example, FIG. 9 shows a state immediately after dies are closed. In a cavity 304, a core lens C acting as an insert is held from above and below by support pins 107 and 207 while being sandwiched between the support pins 107 and 207. To be specific, the core lens C is held by the lower support pins 207 and the upper support pins 107 with an elastic force.

Fixed-side retainer plates 102 are attached to a fixed-side die plate 101 of a molding machine and a fixed-side core 103 is fixed on the fixed-side retainer plates 102. A mounting plate 104 and a driving plate 105 are slidably stored in the fixed-side core 103 in a direction that opens the dies, and the mounting plate 104 and the driving plate 105 are fixed to each other while holding the plurality of support pins 107 and a pressure receiving pin 108 therebetween. Elastic springs 106 are held while being compressed between the driving plate 105 and the fixed-side die plate 101.

Movable-side retainer plates 202 are attached to a movable-side die plate 201 and a movable-side core 203 is fixed in the movable-side retainer plates 202. A mounting plate 204 and a driving plate 205 are slidably stored in the movable-side core 203 in the direction that opens the dies, and the mounting plate 204 and the driving plate 205 are fixed to each other while holding the plurality of support pins 207 and a pressure receiving pin 208 therebetween. Elastic springs 206 are held while being compressed between the driving plate 205 and the movable-side die plate 201. An ejector rod 209 is formed to protrude and retract through a through hole drilled on the movable-side die plate 201, and the end of the ejector rod 209 is disposed to press the driving plate 205.

Resin is injected from a gate 303 to the cavity 304 through inlet holes 301 and 302. Pressure receiving faces formed on the ends of the pressure receiving pins 108 and 208 face the inlet hole 301. Under normal conditions, the support pins 107 and 207 are protruded into the cavity 304 by the elastic forces of the elastic springs 106 and 206. When the core lens C acting as an insert is introduced to be supported by the support pins 107 and the dies are closed, as shown in FIG. 9, the positions of the support pins 107 are kept due to the elastic modulus of the elastic spring 106. The elastic spring 106 has a higher elastic modulus than the elastic spring 206. The elastic springs 206 having a lower elastic modulus than the elastic springs 106 are slightly compressed and the support pins 207 are somewhat retracted. In this way, the core lens C is sandwiched by the support pins 107 and 207 with an elastic force.

When resin is introduced from the inlet hole 301 in this state, the resin fills a space around the core lens C and the pressure receiving surfaces facing the inlet hole 301 are pressed by the injection pressure of the introduced resin, so that the pressure receiving pins 108 and 208 retract and the support pins 107 and 207 retract from the cavity 304.

After that, the resin is cured in a state in which the core lens C floats at the center of the cavity 304, so that resin lenses are formed on both sides of the core lens C.

DISCLOSURE OF THE INVENTION

In the manufacturing method of FIG. 9, the rim of the core lens C is held by the support pins 107 and 207. However, any devices for adjusting centering, inclination, and so on are not described. Such devices are necessary because each core lens C has a shape error. Further, any adjusting methods are not described, suggesting that the positions of optical axes and the like cannot be aligned between the core lens C and the resin lenses. Therefore, it is difficult to obtain optical characteristics in design.

An object of the present invention is to provide a method of manufacturing a composite optical component by which the optical characteristics of a lens formed by composite molding can be easily obtained and high adhesion can be obtained between a lens element and a resin layer.

A method of manufacturing a composite optical component according to claim 1 of the present invention in which a core lens is introduced into a cavity formed by closing a first die and a second die, resin is injected from a resin injection gate to the cavity, and a resin layer is formed around the core lens, the method including the steps of: sliding and centering the core lens in contact with a first bell clamp type holder and a second bell clamp type holder by sandwiching the core lens between the first bell clamp type holder and the second bell clamp type holder and applying a load to the core lens; and molding the resin layer by injecting the resin from the outer periphery of the core lens to the lens center of the core lens in the first and second bell clamp type holders after the core lens is centered.

A method of manufacturing a composite optical component according to claim 2 of the present invention in which, in claim 1, a first tangent line on a surface of the core lens and a second tangent line on a surface of the core lens form an angle of 6 to 8 degrees, the first tangent line being disposed on a contact point between the surface of the core lens and the first bell clamp type holder, the second tangent line being disposed on a contact point between the surface of the core lens and the second bell clamp type holder.

A method of manufacturing a composite optical component according to claim 3 in which, in claim 1, one of the first bell clamp type holder and the second bell clamp type holder has an end coming into contact with the core lens on at least three points.

A method of manufacturing a composite optical component according to claim 4 in which, in claim 2, one of the first bell clamp type holder and the second bell clamp type holder has an end coming into contact with the core lens on at least three points.

A method of manufacturing a composite optical component according to claim 5 in which, in claim 1, one of the first bell clamp type holder and the second bell clamp type holder has an end coming into contact with the core lens on a position not set on a line connecting a thickest portion of the core lens and the resin injection gate.

A method of manufacturing a composite optical component according to claim 6 in which, in claim 2, one of the first bell clamp type holder and the second bell clamp type holder has an end coming into contact with the core lens on a position not set on a line connecting a thickest portion of the core lens and the resin injection gate.

A method of manufacturing a composite optical component according to claim 7 in which, in claim 3, one of the first bell clamp type holder and the second bell clamp type holder has the end coming into contact with the core lens on a position not set on a line connecting a thickest portion of the core lens and the resin injection gate.

A method of manufacturing a composite optical component according to claim 8 in which, in claim 4, one of the first bell clamp type holder and the second bell clamp type holder has the end coming into contact with the core lens on a position not set on a line connecting a thickest portion of the core lens and the resin injection gate.

A method of manufacturing a composite optical component according to claim 9 in which, in claim 1, the core lens is a glass lens.

A composite optical component according to claim 10 of the present invention, including a resin layer formed around a core lens, wherein the composite optical component further includes a recessed portion on a curved surface of the resin layer, the recessed portion reaching a surface of the core lens.

According to this configuration, a resin lens is formed around the core lens centered using the first bell clamp type holder and the second bell clamp type holder in the first die and the second die. Thus it is possible to improve the alignment of the optical axes of the core lens and the resin lens to easily obtain optical characteristics, and it is further possible to easily manufacture a composite optical component having high adhesion by covering the core lens with the resin lens.

BRIEF DESCRIPTION OF THE DRAWINGS

FIG. 9 is a structural sectional view showing dies in a conventional method of manufacturing a composite optical component.

DESCRIPTION OF THE EMBODIMENTS

Referring to FIGS. 1 to 8A and 8B, the following will describe a specific embodiment of a method of manufacturing a composite optical component according to the present invention.

Figure 1:
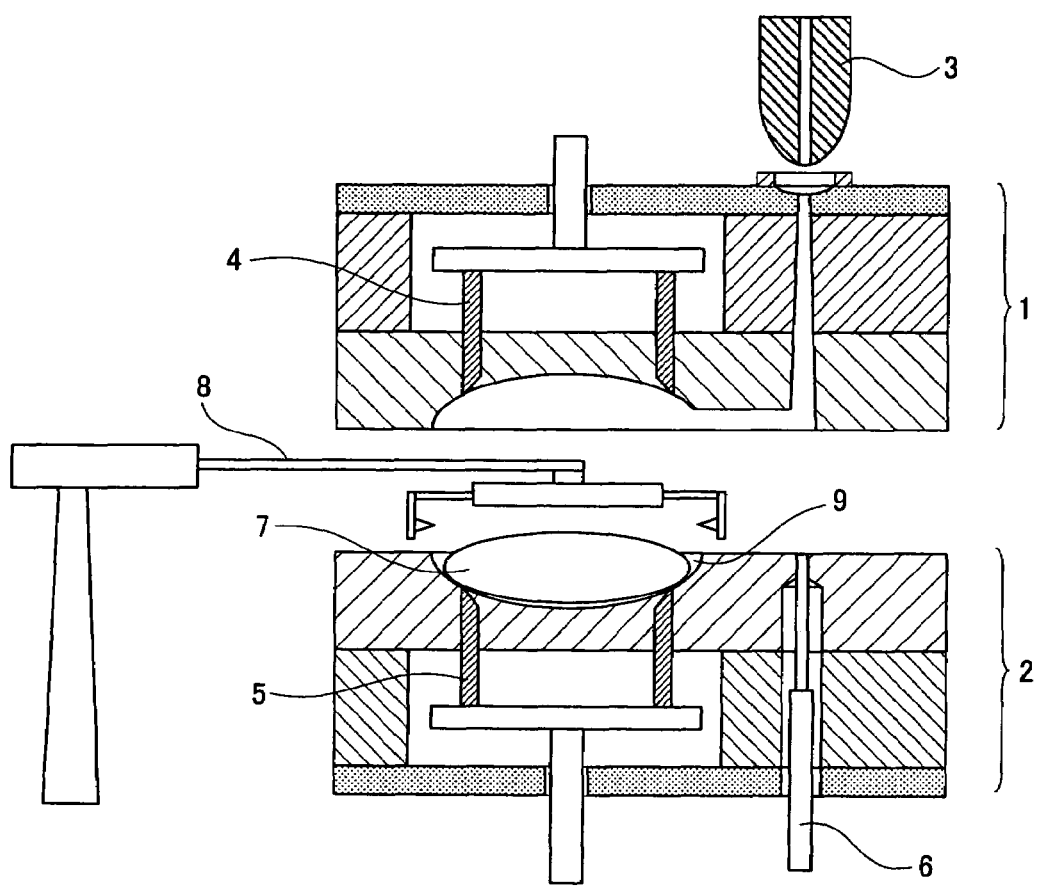
FIG. 1 is a sectional view showing dies in a state in which a core lens is introduced into the product portion of the die in a method of manufacturing a composite optical component according to an embodiment of the present invention.

FIG. 1 shows a state in which a core lens is introduced into a product portion of a die. Reference numeral 1 denotes a first die capable of opening/closing in the gravity direction on the movable side and reference numeral 2 denotes a second die on the fixed side. In the following description, the manufacturing of a convex lens of the composite optical component will be taken as an example.

First, a nozzle 3 of an injection molding machine is retracted by a sufficient distance. After that, the first die 1 is moved upward to be opened. At this moment, a first bell clamp type holder 4 and a second bell clamp type holder 5 are stored in the first die 1 and the second die 2. An ejector pin 6 is stored in the fixed-side die 2.

The first bell clamp type holder 4 and the second bell clamp type holder 5 each have an end divided in, for example, three or four.

Next, a core lens 7 of the convex glass lens is introduced from the outside of the die and is placed in a product portion 9 of the second die 2 by a transfer mechanism 8. After the core lens 7 is introduced, the transfer mechanism 8 is retracted to the outside of the die. A representative glass material used for the core lens 7 includes BK7 and SF2.

The core lens 7 introduced by the transfer mechanism 8 is sandwiched between the first bell clamp type holder 4 and the second bell clamp type holder 5 and a load is applied to the holders before the dies are closed, so that the core lens 7 is slid in contact with the first and second bell clamp type holders 4 and 5 and is automatically centered as will be described later. The first bell clamp type holder 4 and the second bell clamp type holder 5 are made of brass and the load applied to these holders is 5 kg in the present embodiment.

Figure 3:
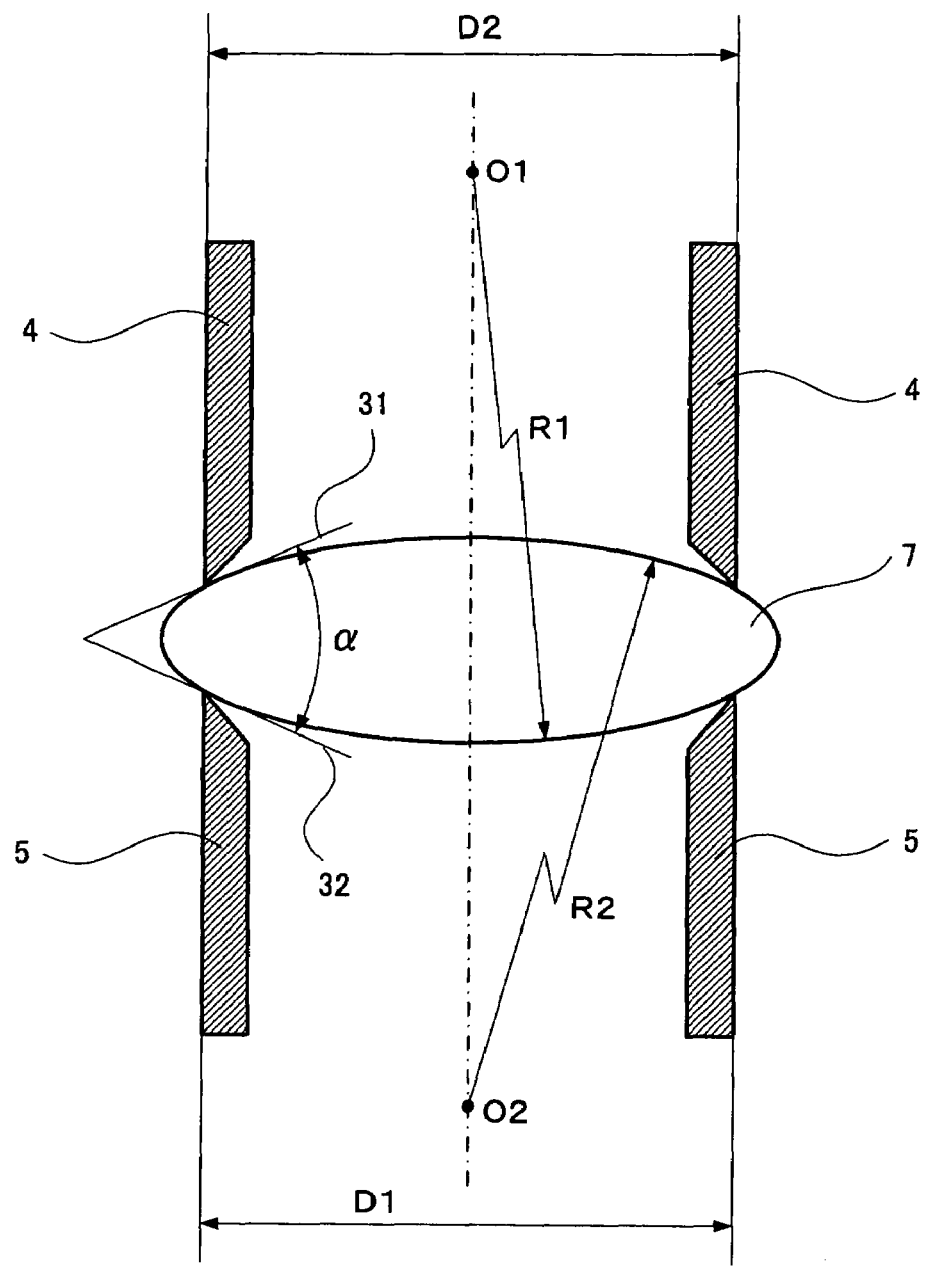
FIG. 3 is an enlarged view schematically showing that the core lens is held by first and second bell clamp type holders according to the embodiment.

FIG. 3 shows a state in which the core lens 7 is held by the first bell clamp type holder 4 and the second bell clamp type holder 5.

Reference characters O1 and O2 denote the center of curvature of the lens, reference characters R1 and R2 denote the radii of curvature of the lens, reference character D1 denotes the diameter of the first bell clamp type holder 4, and reference character D2 denotes the diameter of the second bell clamp type holder 5. In this case, D1=D2 is obtained. However, D1>D2 may be set to stably support the core lens 7.

A centering method by means of the bell clamp type holding mechanism uses the following principle: the lens is held from both sides by the holders having pointed ends and a load is applied toward both sides of the core lens 7 to bring the holders into intimate contact with the core lens 7, so that portions making contact with the holders have an even thickness on the entire perimeter of the lens and the optical axis of the lens is aligned with the rotation axes of the holders.

In an actual operation, the core lens 7 is slid between the two holders, so that the core lens 7 is centered and placed on a stable position. The stable position on which the core lens 7 stops sliding is determined by a balance between a friction force and a sliding force. In the present embodiment, the stable position is a position on which a contact angle α formed on the ends of the holders by the tangent lines of both surfaces of the core lens 7 is not larger than 8 degrees. When the contact angle is not larger than 6 degrees, sliding does not occur and thus the core lens 7 cannot be centered. Therefore, at the completion of centering, a contact angle of 6 to 8 degrees is formed by a first tangent line 31 on the surface of the core lens 7 and a second tangent line 32 on the surface of the core lens 7. The first tangent line 31 is disposed on a contact point between the surface of the core lens 7 and the first bell clamp type holder 4 and the second tangent line 32 is disposed on a contact point between the surface of the core lens 7 and the second bell clamp type holder 5. The sliding operation is not affected by the magnitude of the load.

Figure 2:
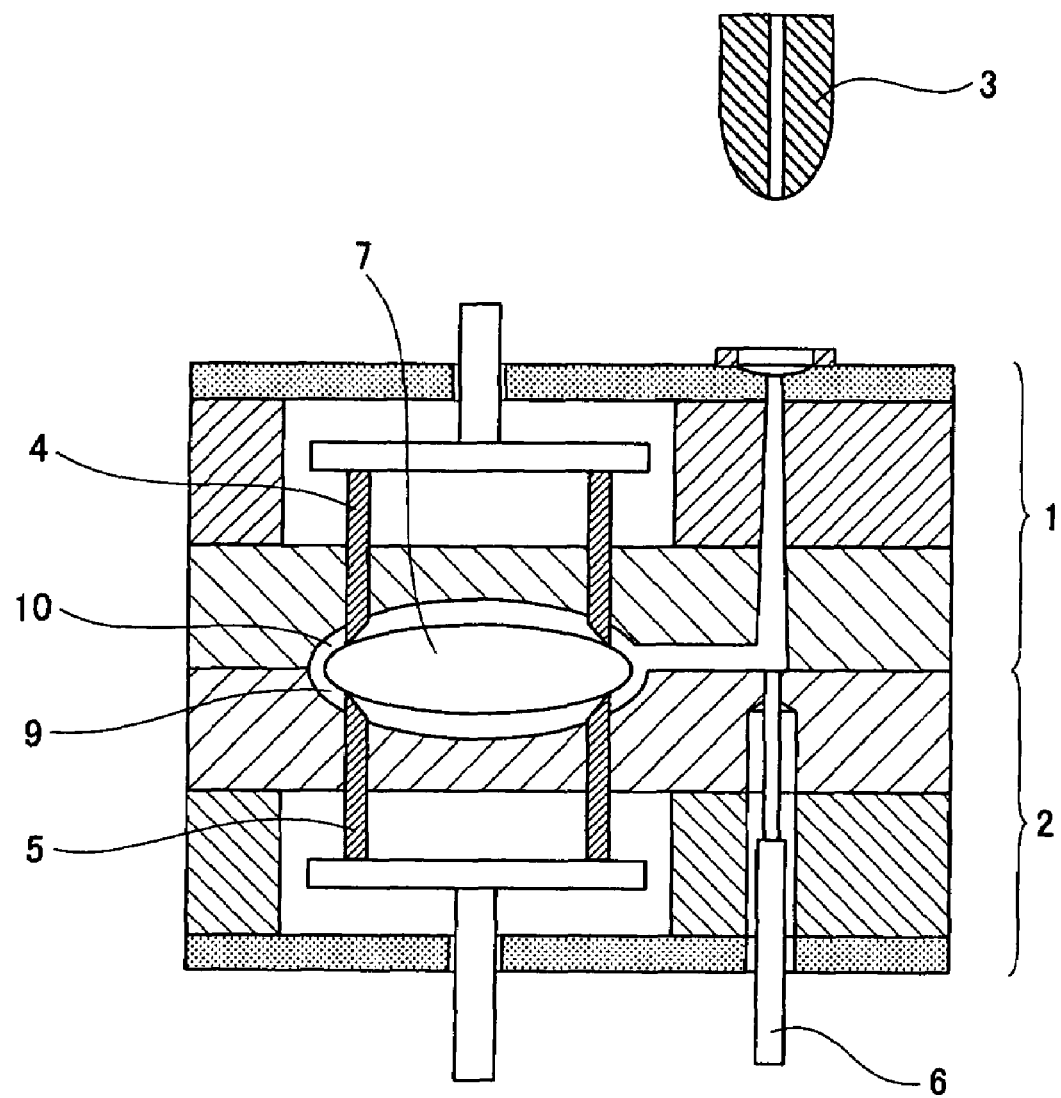
FIG. 2 is a sectional view showing the dies in a state in which the first die and the second die are closed according to the embodiment.

FIG. 2 shows a state in which the first die 1 and the second die 2 are closed to form a cavity. In this state, the height of protrusion of the first bell clamp type holder 4 and the second bell clamp type holder 5 from the surfaces of the product portions 9 and 10 of the first die 1 and the second die 2 is equal to a necessary thickness of a resin lens layer.

Figure 4:
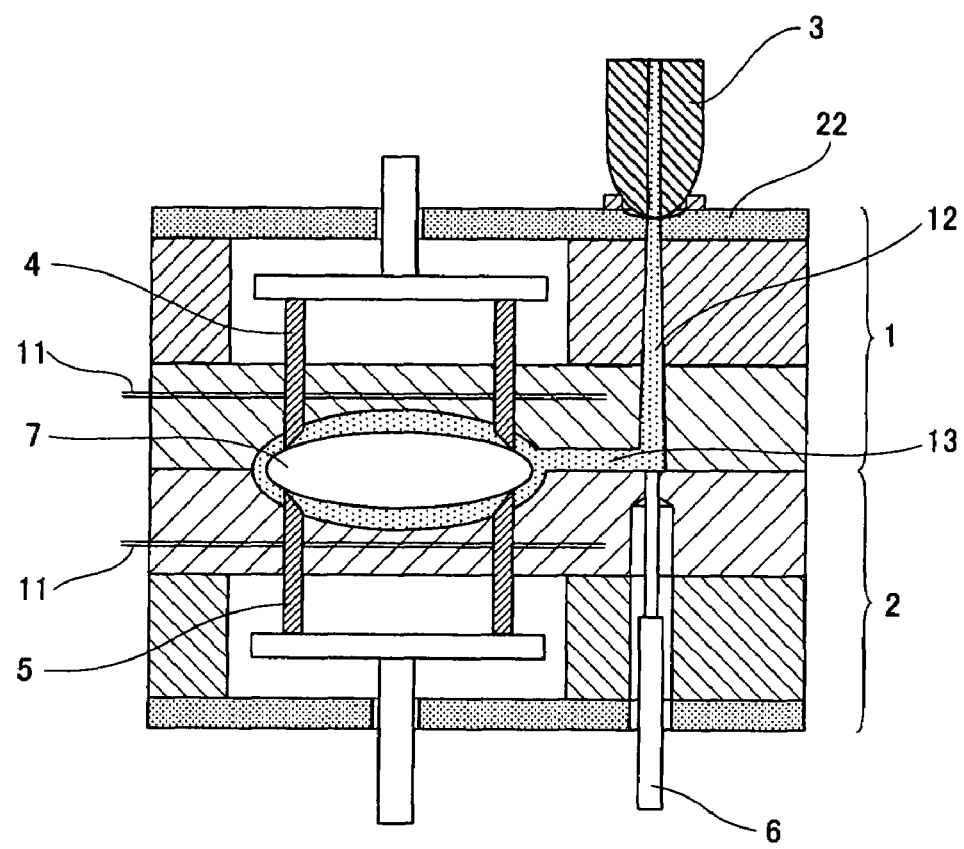
FIG. 4 is a sectional view showing the dies in injection molding according to the embodiment.

Next, as shown in FIG. 4, injection molding is performed.

The end of the nozzle 3 of the injection molding machine is brought into contact with a sprue bush 22 of the closed die, and then resin is injected into the dies. As an injection molding resin of an optical component, thermoplastic methacrylate resin (PMMA) and polycarbonate (PC) are representative materials. Polycarbonate is used in the present embodiment. The die is heated to 80° C. by a heater 11 and then, injection molding is performed. The injected resin passes through a sprue 12 and a runner 13 and fills a space around the core lens 7 held in the product portions 9 and 10 by the first bell clamp type holder 4 and the second bell clamp type holder 5.

Figure 5A:
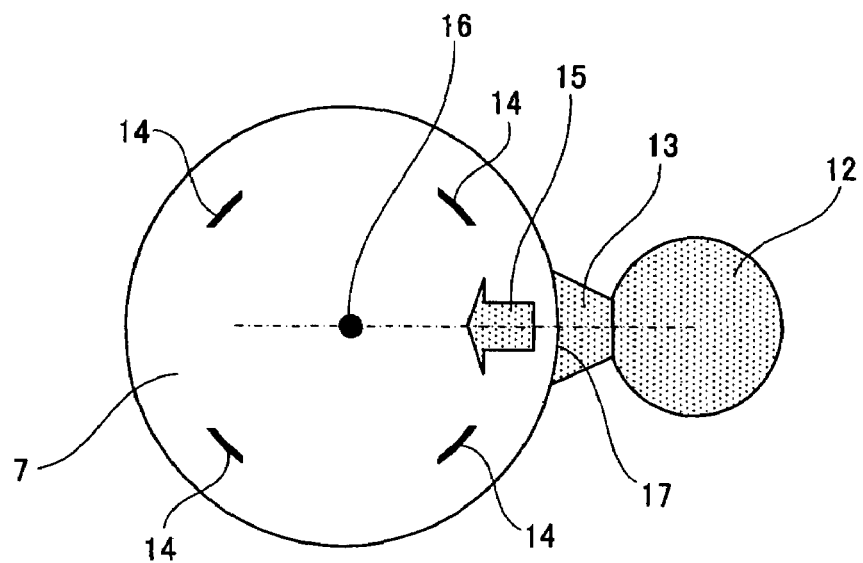
FIG. 5A shows the positional relationship between the core lens and the ends of the first and second bell clamp type holders, the core lens being supported on four points according to the embodiment.
Figure 5B:
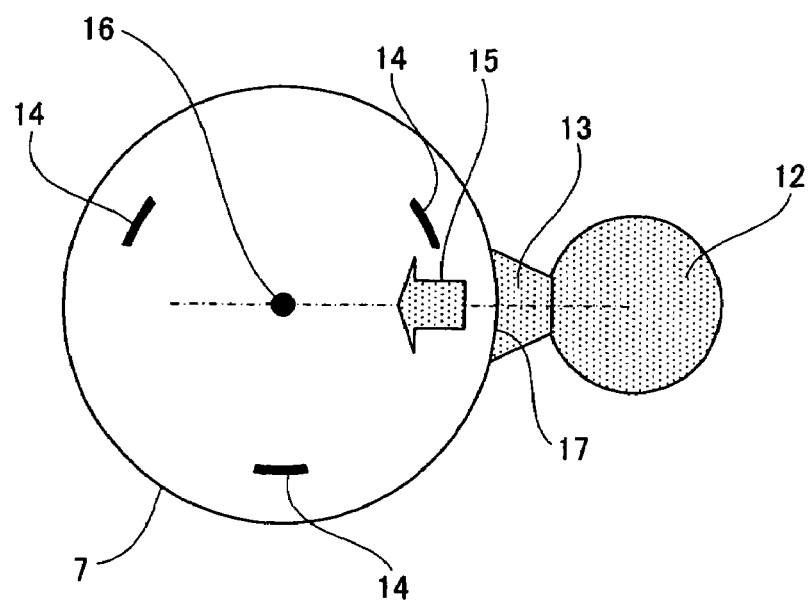
FIG. 5B shows the positional relationship between the core lens and the ends of the first and second bell clamp type holders, the core lens being supported on three points according to the embodiment.

The surfaces of the product portions 9 and 10 are formed to enable lens functions, and the shapes of the surfaces of the product portions 9 and 10 are transferred to the resin cured after the filling of the resin. The first bell clamp type holder 4 and the second bell clamp type holder 5 keep applying the load to the core lens 7 until the curing of the resin is completed, so that the injected resin does not move the core lens 7. FIGS. 5A and 5B show the positional relationship between the core lens 7 and ends 14 of the first bell clamp type holder 4 and the second bell clamp type holder 5. The positional relationship is viewed from the nozzle 3 of the molding machine.

When the holder ends 14 make contact with the core lens 7 along the perimeter of the core lens 7, it becomes difficult to inject the resin into the holders during injection molding. Thus the ends 14 are preferably brought into contact on discontinuous points. FIG. 5A shows four-point support enabling a simple configuration and high accuracy with ease. FIG. 5B shows support on three points. The number of support points may be more than four. In FIGS. 5A and 5B, with respect to the direction (arrow 15) that the resin filling the sprue 12 and the runner 13 flows on the core lens 7, the holder ends 14 are not disposed between an optical center 16 having the largest thickness in the core lens 7 and the center of a gate 17 such that the holder ends 14 do not interfere with the flow of the resin.

To be specific, the support points are disposed at angles uniformly distributed with respect to the optical center of the core lens 7 and in the space around the core lens 7 other than the effective optical range. The necessary conditions are that the support points are not disposed on a straight line connecting the optical center of the core lens 7 and the resin molding gate and the number of the support points is at least three. In this state, the resin is injected from the gate 17 such that the resin flows from the outer periphery of the core lens 7 to the lens center of the core lens 7 in the first and second bell clamp type holders 4 and 5, so that a resin layer is formed.

In a composite lens which is formed according to the positional relationship between the support points and the gate and has the core lens disposed at the center and the resin injected around the core lens, recessed portions 21 corresponding to the support points reach from the surrounding resin layer to the surface of the core lens 7. The recessed portions 21 are disposed in the space around the lens other than the effective optical range of the composite lens.

Figure 6:
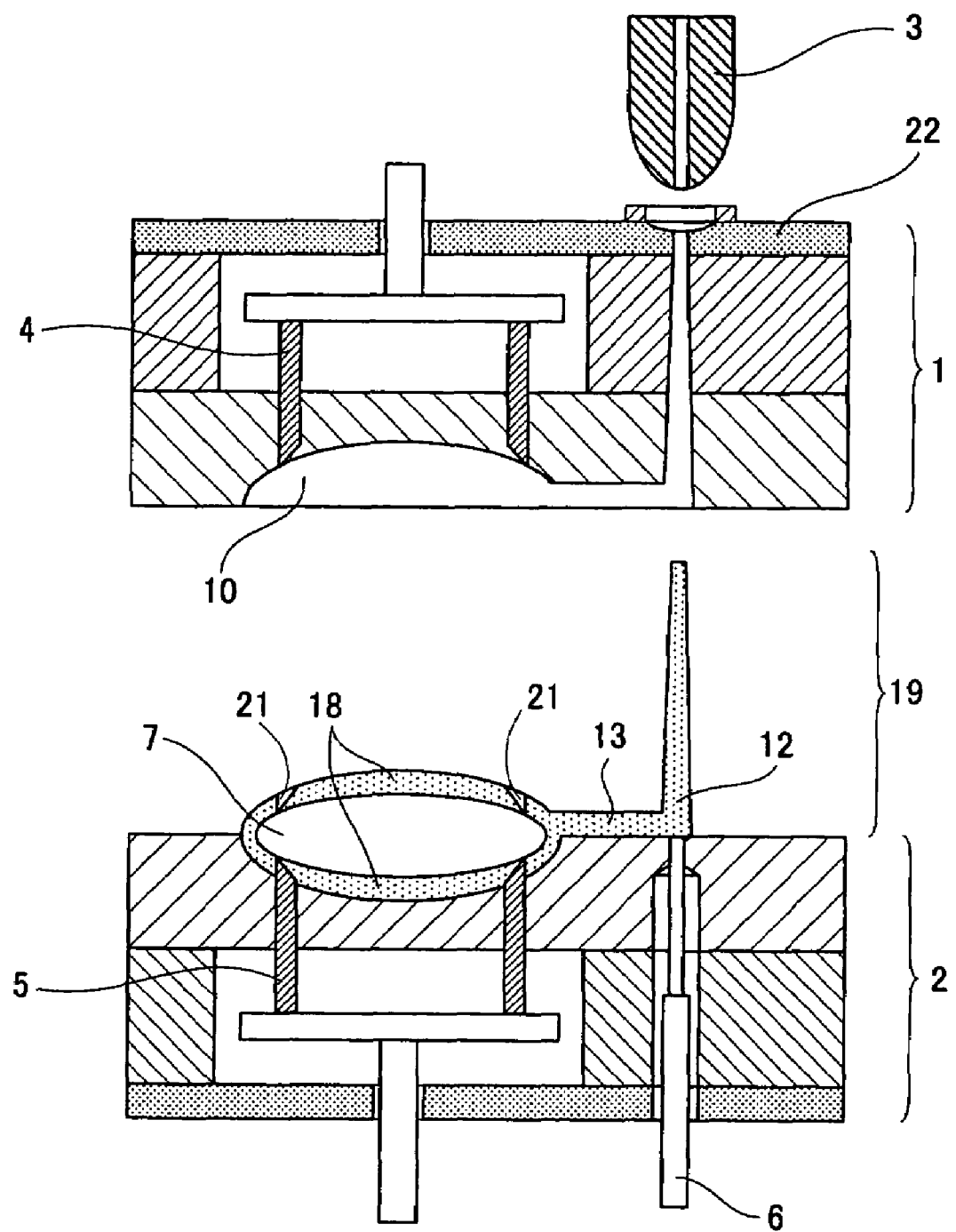
FIG. 6 is a sectional view showing the dies opened after injected resin is cured according to the embodiment.

FIG. 6 shows a state in which the dies are opened after the injected resin is cured.

First, the nozzle 3 of the injection molding machine is sufficiently retracted so as not to interfere with the first die 1. Next, the ends of the first bell clamp type holder 4 of the first die 1 are retracted so as not to appear on the surface of the product portion 10. After that, the first die 1 is retracted upward to open the dies. The second bell clamp type holder 5 of the second die 2 remains on a molding position to hold a molded component 19 made up of the sprue 12, the runner 13, the core lens 7, and a resin lens layer 18.

Figure 7:
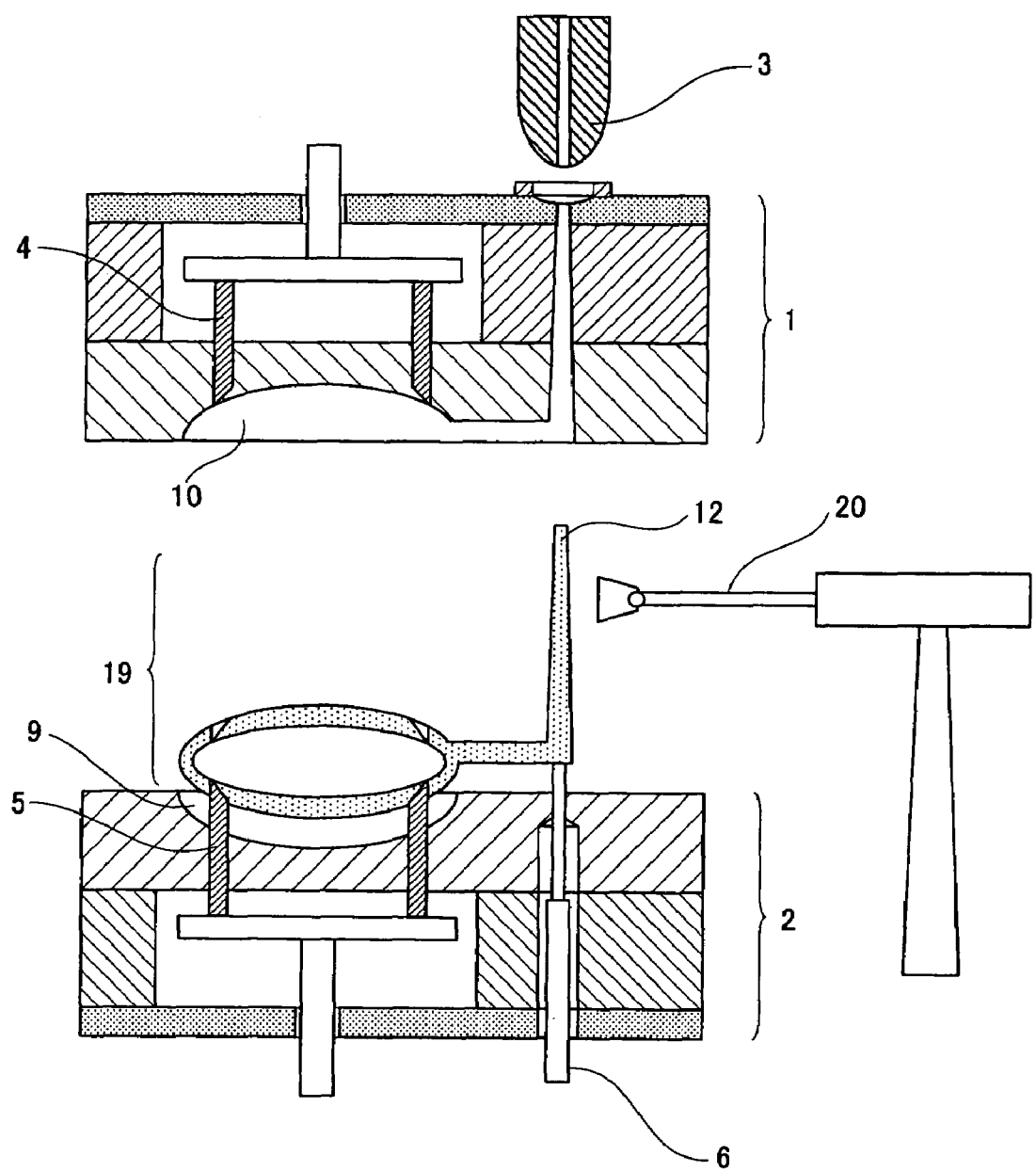
FIG. 7 is a sectional view showing the dies in a state in which a molded component is protruded from the die according to the embodiment.

FIG. 7 shows a state in which the molded component 19 is protruded from the product portion 9 of the second die 2.

The sprue 12 is completely removed from the first die 1 and the dies are opened at a sufficient distance from each other so as not to interfere with each other. After that, the second bell clamp type holder 5 and an ejector pin 6 are further protruded from the inside of the second die 2 to protrude the molded component 19 from the product portion 9. After the sprue 12 is held by a lifting device 20 in this state, the second bell clamp type holder 5 and the ejector pin 6 are retracted in the gravity direction and the molded component 19 is held in a hollow. And then, the molded component 19 is moved out of the dies by the lifting device 20 and is collected.

Figure 8A:
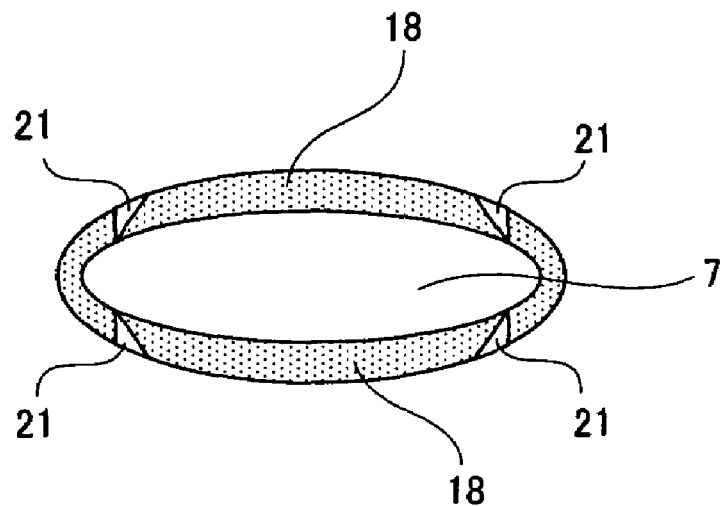
FIG. 8A is a sectional view showing the composite optical component after the gate of the molded component is cut according to the embodiment.
Figure 8B:
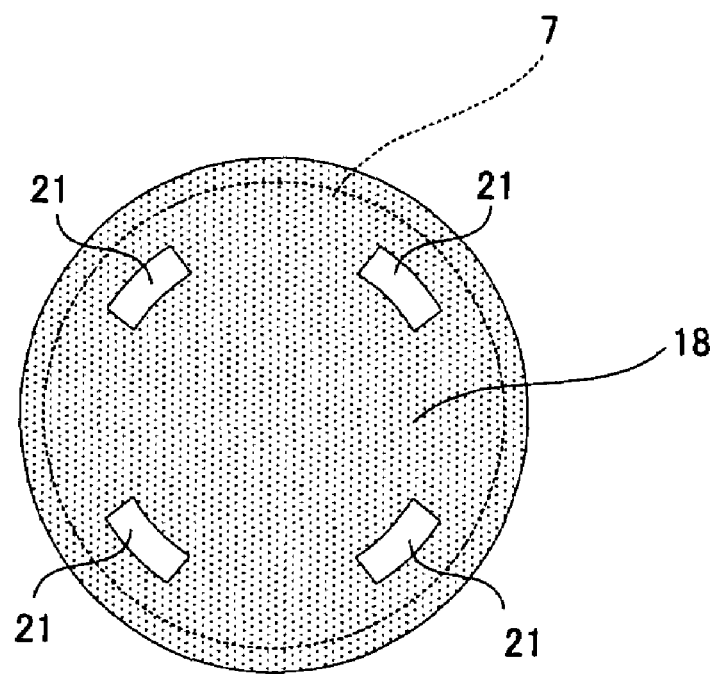
FIG. 8B is a top view showing the composite optical component after the gate of the molded component is cut according to the embodiment.

FIGS. 8A and 8B are schematic diagrams showing the appearance of the composite optical component obtained by cutting the molded component off from the gate. FIGS. 8A and 8B are also a sectional view and a top view showing that a four-point support holder is used.

The molded component 19 is held by the first bell clamp type holder 4 and the second bell clamp type holder 5 until the resin is cured. Thus the four recessed portions 21 shaped like wedges reaching the surfaces of the core lens 7 remain on the curved surface of the resin lens layer 18 formed on both sides of the core lens 7. In the recessed portion 21, a contact angle formed by tangent lines is 6 to 8 degrees on the front and back sides of the core lens 7. Since the resin lens layer 18 covers the core lens 7, high adhesion is obtained without an adhesive and the resin lens layer 18 does not peel off from the core lens 7.

Methacrylate resin has a coefficient of thermal expansion of 5 to $9 \times 10^{-5}$/K and polycarbonate has a coefficient of thermal expansion of $7 \times 10^{-5}$/K. These coefficients of thermal expansion are higher than the coefficient of thermal expansion of a glass material which is in the order of $10^{-6}$/K. For this reason, even in a usage environment where a temperature is higher than an ambient temperature, the resin lens layer 18 is less susceptible to damage such as a crack caused by the expansion of the core lens 7.

In the embodiment, the method of manufacturing the single composite optical component having the resin lens layer 18 covering the core lens 7 was described as an example. The present invention can also be similarly implemented when a cabinet component to be assembled with a composite optical component and the resin lens layer 18 are integrally resin molded and insert molding is performed with the composite optical component requiring the alignment of an optical axis.

Moreover, in a period during which the core lens 7 is held by the first bell clamp type holder 4 and the second bell clamp type holder 5, the core lens 7 may be held by protruding the first bell clamp type holder 4 and the second bell clamp type holder 5 after the dies are closed.

Although FIGS. 2 and 3 illustrate, as an example, the resin layer having an even thickness on the top surface and the undersurface of the core lens 7, the present invention can also be similarly implemented when the resin layer has an uneven thickness.

The present invention can contribute to higher functionality of a camera phone, the pickup of an optical disk recording/reproducing apparatus, and so on.

What is claimed is:

1. A method of manufacturing a composite optical component in which a core lens is introduced into a cavity formed by closing a first die and a second die, resin is injected from a resin injection gate to the cavity, and a resin layer is formed around the core lens, the method comprising:
   sliding and centering the core lens in contact with a first bell clamp type holder and a second bell clamp type holder by sandwiching the core lens between the first bell clamp type holder and the second bell clamp type holder and applying a load to the core lens; and
   molding the resin layer by injecting the resin from an outer periphery of the core lens to a lens center of the core lens in the first and second bell clamp type holders after the core lens is centered,
   wherein a first tangent line on a surface of the core lens and a second tangent line on a surface of the core lens form an angle of 6 to 8 degrees, the first tangent line located on a contact point between the surface of the core lens and the first bell clamp type holder, the second tangent line located on a contact point between the surface of the core lens and the second bell clamp type holder.

2. The method of manufacturing a composite optical component according to claim 1, wherein one of the first bell clamp type holder and the second bell clamp type holder has an end that contacts the core lens on at least three points.

3. The method of manufacturing a composite optical component according to claim 2, wherein one of the first bell clamp type holder and the second bell clamp type holder has the end that contacts the core lens at a position not set on a line connecting a thickest portion of the core lens and the resin injection gate.

4. The method of manufacturing a composite optical component according to claim 1, wherein one of the first bell clamp type holder and the second bell clamp type holder has an end that contacts the core lens at a position not set on a line connecting a thickest portion of the core lens and the resin injection gate.

5. A method of manufacturing a composite optical component in which a core lens is introduced into a cavity formed by closing a first die and a second die, resin is injected from a resin injection gate to the cavity, and a resin layer is formed around the core lens, the method comprising:
   sliding and centering the core lens in contact with a first bell clamp type holder and a second bell clamp type holder by sandwiching the core lens between the first bell clamp type holder and the second bell clamp type holder and applying a load to the core lens; and
   molding the resin layer by injecting the resin from an outer periphery of the core lens to a lens center of the core lens in the first and second bell clamp type holders after the core lens is centered;
   wherein one of the first bell clamp type holder and the second bell clamp type holder has an end that contacts the core lens on at least three points.

6. The method of manufacturing a composite optical component according to claim 5, wherein one of the first bell clamp type holder and the second bell clamp type holder has the end that contacts the core lens at a position not set on a line connecting a thickest portion of the core lens and the resin injection gate.

7. A composite optical component comprising a resin layer formed around a core lens, the resin layer comprising two curved portions on opposite sides of the core lens.
   wherein the composite optical component further comprises at least three recessed portions on at least one of the curved portions of the resin layer, the recessed portions extending from an outer surface of the curved portion and contacting a surface of the core lens.

* * * * *